(12) United States Patent
Abhishek et al.

(10) Patent No.: US 7,969,954 B2
(45) Date of Patent: *Jun. 28, 2011

(54) DIRECT WIRELESS CLIENT TO CLIENT COMMUNICATION

(75) Inventors: Abhishek Abhishek, Sammamish, WA (US); Amer A. Hassan, Kirkland, WA (US); Thomas W. Kuehnel, Seattle, WA (US); Noel W. Anderson, Bellevue, WA (US); Christian Huitema, Clyde Hill, WA (US); Jiandong Ruan, Sammamish, WA (US); Francis Duong, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/542,357

(22) Filed: Aug. 17, 2009

(65) Prior Publication Data

US 2009/0303934 A1 Dec. 10, 2009

Related U.S. Application Data

(63) Continuation of application No. 11/177,515, filed on Jul. 8, 2005, now Pat. No. 7,577,125.

(51) Int. Cl.
*H04W 4/00* (2009.01)
(52) U.S. Cl. ......... 370/338; 370/328; 370/329; 370/349
(58) Field of Classification Search .................. None
See application file for complete search history.

(56) References Cited

U.S. PATENT DOCUMENTS

| | | | |
|---|---|---|---|
| 6,791,962 B2 | 9/2004 | Wentink | |
| 2002/0022483 A1 | 2/2002 | Thompson et al. | |
| 2003/0156558 A1 | 8/2003 | Cromer et al. | |
| 2004/0008663 A1 | 1/2004 | Srikrishna et al. | |
| 2004/0127214 A1 | 7/2004 | Reddy et al. | |
| 2004/0223469 A1 | 11/2004 | Bahl et al. | |
| 2005/0135305 A1 | 6/2005 | Wentink | |
| 2005/0174962 A1 | 8/2005 | Gurevich | |
| 2006/0104210 A1 | 5/2006 | Nielsen | |
| 2006/0142034 A1 | 6/2006 | Wentink et al. | |
| 2006/0165035 A1 | 7/2006 | Chandra et al. | |
| 2006/0227753 A1 | 10/2006 | Vleugels et al. | |
| 2008/0194201 A1 | 8/2008 | Sinivaara et al. | |

OTHER PUBLICATIONS

Search Report and Written Opinion dated Jun. 11, 2007 for International Application No. PCT/US06/26821.

Bob O'Hara et al., "*IEEE 802.11 Handbook . . . A Designer's Companion Second Edition*" 1956, pp. 182-190, Library of Congress Cataloging-in-Publication Data, IEEE 3 Park Avenue, New York, NY 10016-5997, USA.

IEEE Computer Society, "*Amendment 7: Medium Access Control (MAC) Quality of Service (QoS) Enhancements*", IEEE P802.11e/D12.0 Nov. 2004, pp. iii-xvi and 1-179, The Institute of Electrical and Electronics Engineers, Inc. 3 Park Avenue, New York, NY 10016-5997, USA.

*Primary Examiner* — Kent Chang
*Assistant Examiner* — German Viana Di Prisco
(74) *Attorney, Agent, or Firm* — Wolf, Greenfield & Sacks, P.C.

(57) ABSTRACT

A wireless station is connected to a wireless network through an access point and can establish a direct client-to-client connection to a second wireless station. The wireless station can communicate directly with the second wireless station without involving the access point. The wireless station communicates with the wired network and with other wireless stations through the access point. The second wireless station may have an infrastructure connection to the access point or may be independent.

20 Claims, 4 Drawing Sheets

DIRECT WIRELESS CLIENT TO CLIENT COMMUNICATION

RELATED APPLICATION

This application is a continuation of pending application Ser. No. 11/177,515 entitled DIRECT WIRELESS CLIENT TO CLIENT COMMUNICATION, filed on Jul. 8, 2005.

TECHNICAL FIELD

This invention relates to wireless networks and, more particularly, to direct wireless client to client communication in a wireless network.

BACKGROUND

In a typical wireless network, one or more wireless stations are associated with a common wireless access point. Communication between wireless stations is through the access point, which limits access to stations that have accepted security credentials and provides an interface to other networks, such as a wired network and/or a public network, such as the Internet.

The IEEE 802.11 standard for wireless local area networks (LANs) provides for an infrastructure-operating mode in which wireless stations communicate with an access point and an ad hoc operating mode in which wireless stations communicate directly with each other but do not communicate with an access point. In the infrastructure operating mode, all data is transmitted twice, even if the sender and the recipient can reach each other directly. Data is sent to the access point and is subsequently forwarded by the access point to the recipient. Since data is transmitted twice, the available bandwidth of the wireless network is reduced by one-half.

In the ad hoc operating mode, wireless stations communicate directly with each other without the use of a wireless access point or a wired network. This operating mode does not allow the wireless stations to use a common access point to validate security credentials or to provide communications with the public network.

SUMMARY

A wireless station is connected to a wireless network through an access point and can establish a direct client-to-client connection to a second wireless station. The wireless station can communicate directly with the second wireless station without involving the access point. The wireless station communicates with the wired network and with other wireless stations through the access point. The second wireless station may have an infrastructure connection to the access point or may be independent.

In one embodiment, a method for communication in a wireless network includes establishing an infrastructure channel between a first wireless station and a wireless access point connected to a network, establishing a direct link channel between the first wireless station and a second wireless station without action by the access point, selecting a channel from the direct link channel and the infrastructure channel, and communicating on the selected channel.

In another embodiment, a wireless station for operation in a wireless network includes a first component that establishes an infrastructure channel to an access point of the wireless network, a second component that establishes a direct link channel to a second wireless station without action by the access point, a third component that selects a channel from the direct link channel and the infrastructure channel, and a fourth component that communicates on the selected channel.

In a further embodiment, a method for establishing a direct link connection between first and second wireless stations in a wireless network includes sending from the first wireless station to the second wireless station a probe request packet containing capability information of the first wireless station, receiving from the second wireless station a probe response packet containing capability information of the second wireless station, and establishing a direct link state based on the received capability information, the direct link state defining the direct link channel between the first and second wireless stations.

DETAILED DESCRIPTION

Embodiments of the invention provide a mechanism that allows wireless stations in an infrastructure setting, i.e., associated with an access point, to communicate directly with each other without involving the infrastructure in the transfer of data packets. The mechanism can be realized by changes to cooperating wireless stations and does not require changes or modifications to infrastructure components such as access points.

The mechanism involves only software on the wireless stations. The infrastructure does not require modification and in fact is unaware that the direct link channels exist. This simplifies deployment and allows cooperating wireless stations to use the direct connect mechanism in existing wireless environments. The operation and interaction between wireless stations has no effect on any wireless station that does not support direct connect. Direct communication provides a way for two clients to directly communicate with each other without requiring the access point as the intermediary.

Figure 1:
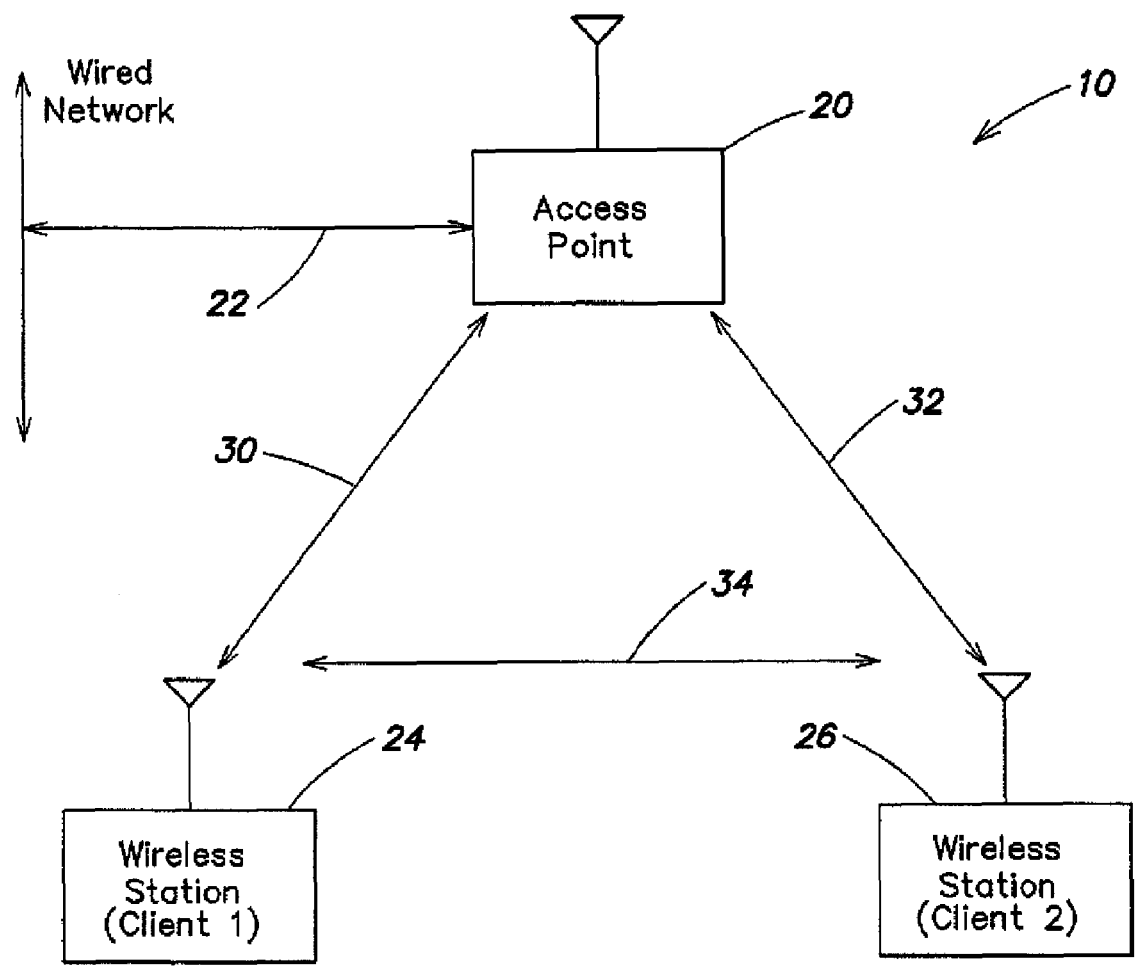
FIG. 1 is a simplified block diagram of a wireless network in accordance with an embodiment of the invention.

An example of a wireless local area network 10 is shown in FIG. 1. A wireless access point (AP) 20 communicates with a wired network through a wire connection 22 and communicates with a first wireless station 24 and a second wireless station 26 via wireless links. By way of example only, access point 20 may be a wireless router and wireless stations 24 and 26 may be notebook computers having wireless capability. Wireless station 24 may be designated as client 1, and wireless station 26 may be designated as client 2 in the wireless network.

Each of the wireless stations may include a computing device with one or more processors equipped with an operating system to create a platform for application programs. The hardware portion of each wireless station may include one or more processors such as are now known or hereafter developed for use in computing devices. The software portion of each wireless station may include an operating system incorporating communication software as described below.

Client 1 establishes an infrastructure connection to access point 20 using a standard protocol defined by IEEE 802.11. Client 2 may establish an infrastructure connection to access point 20 in the same manner. However, in some embodiments, client 2 does not have an infrastructure connection to the wireless network. The infrastructure connections define an infrastructure channel between each wireless station and the access point 20. Thus, an infrastructure channel 30 associates station 24 with access point 20, and an infrastructure channel 32 associates station 26 with access point 20.

The following assumptions apply to wireless station 24.
(a) SSID/Desired network=Configured desired network name
(b) Type of network=Infrastructure
(c) BSSID=BSSID broadcast by the AP
(d.1) Security=NONE
(d.2) Security=PSK
(a) Type of PSK=WEP-PSK
   Unicast key=WEP-PSK—same for all clients in the BSS
   Multicast/broadcast key=WEP-PSK—same for all clients in the BSS
(b) Type of PSK=WPA-PSK
   Unicast key=PTK (AP)—generated off master PSK and unique to Client 1 and AP pair
   Multicast/broadcast key=GK (AP)—generated off master PSK and same for all clients in the BSS when AP requires support for WPA
   Multicast/broadcast key=WEP-PSK—same for all clients in the BSS when AP allows WEP
(b) Type of PSK=WPA2-PSK
   Unicast key=PTK2 (AP)—generated off master PSK and unique to Client 1 and AP pair
   Multicast/broadcast key=GK2 (AP)—generated off master PSK and same for all clients in the BSS when AP requires support for WPA2
   Multicast/broadcast key=GK (AP)—generated off master PSK and same for all clients in the BSS when AP allows WPA
   Multicast/broadcast key=WEP-PSK—same for all clients in the BSS when AP allows WEP
(d.2) Security=802.1X based WEP, WPA or WPA2
Unicast key=WEP (AP)—Unique to Client 1 and AP pair if AP allows WEP and Client 1 is only WEP capable
Unicast key=PTK (AP)—Unique to Client 1 and AP pair if AP allows WPA and Client 1 is only WPA capable
Unicast key=PTK2 (AP)—Unique to Client 1 and AP pair if AP allows WPA2 and Client 1 is WPA2 capable
Multicast/broadcast key=WEP (AP)—same for all clients in the BSS when AP allows WEP
Multicast/broadcast key=GK (AP)—same for all clients in the BSS when AP allows WPA
Multicast/broadcast key=GK2 (AP)—same for all clients in the BSS when AP requires support for WPA2
(e) PHY type on Client 1 and PHY type on AP
Client 1=11b and AP=11b
Client 1=11b and AP=11g
Client 1=11g and AP=11b
Client 1=11g and AP=11 g
Client 1=11a and AP=11a
In the above description, the following acronyms are used:
SSID=service set identity
BSSID=basic service set identifier
PSK=preshared key
WEP=wired equivalent privacy
BSS=basic service set
WPA=Wi-Fi Protected Access™
PTK=pairwise transient key
GK=group key
PHY=physical layer After the infrastructure connection is established between wireless station 24 and access point 20, a quality of service (QoS) function on wireless station 24 performs throughput tests, such as a packet pair test, with another wireless station, such as wireless station 26 that is also connected to access point 20. While performing these tests, wireless stacks on stations 24 and 26 transmit and receive packets through access point 20.

Assume that wireless station 24 and wireless station 26 both support direct communication as described herein and that both stations have an infrastructure connection to access point 20. The two wireless stations may operate under the assumptions described above or may have the following different assumptions: (a) the security method and key used for Unicast traffic on station 26 can be different from the ones used on wireless station 24; and (b) the PHY type on station 26 and the PHY type on station 24 may be as follows: station 26 may operate according to 802.11b and station 24 may operate according to 802.11g, or station 26 may operate according to 802.11g and station 24 may operate according 802.11b.

Wireless station 24 may then perform discovery of other wireless stations for direct communication. As a first step in discovering other clients for direct communication, the wireless stack in station 24 sends a probe request packet containing a custom information element. The probe request header contains the following fields: (a) SSID/Desired network=configured desired network name; (b) Type of network=infrastructure; and (c) BSSID=BSSID broadcasted by the access point. The custom information element contains capability information about client 1, including: (a) PHY type supported by client 1; (b) rate set supported by client 1; (c) security negotiated by client 1 with the access point; and (d) security capability supported by client 1. The value field of the custom information element can be encrypted and integrity protected using the group security method and group key if multicast/broadcast traffic security is applicable in the BSS.

The probe request performs a reachability test between two wireless stations for direct communication. Communicating through the access point 20 does not work since the two wireless stations may be hidden from each other. The probe request is a standard way to exchange capability information and to form a virtual association in ad hoc network operation. The probe request is transmitted at the lowest rate of the BSS basic rate set broadcast by the access point to provide maximum reachability similar to the beacon packet transmitted by the access point at the lowest rate of the BSS basic rate set. Then a statistically optimal rate is determined through link rate management for each direct communication client.

Client 2 receives the probe request. The wireless stack in client 2 extracts the custom information element and decrypts the value field if it was received in encrypted form. The wireless stack on client 2 then sends a probe response containing a custom information element. The probe response is set with the type of network set as ad hoc. This is needed to avoid confusing the basic service set. The custom information element in the probe response contains capability information about client 2, including: (a) PHY type supported by client 2; (b) rate set supported by client 2; (c) security negotiated by client 2 with the access point; and (d) security capability supported by client 2. The wireless stack in client 2 creates a direct link state for client 1 with the matching capability set. Client 2 also performs a timeout of the direct link state if it does not receive any response from client 1.

Client 1 receives the probe response from client 2. The wireless stack on client 1 extracts the custom information element from the probe response and decrypts the value field if received in encrypted text. The wireless stack in client 1 creates a direct link state for client 2 with the matching capability set. Client 1 also performs a timeout of the direct link state if it does not receive any response from client 2. The direct link states in clients 1 and 2 define a direct link connection which establishes a direct link channel 34 between stations 24 and 26.

Based on the auto-negotiated security level for Unicast traffic between the two wireless stations, the wireless stacks in the clients 1 and 2 proceed according to the following parameters.

(a.1) Unicast Security=NONE
  Indicate to any listener service and driver that the direct communication link is established with the other client. The indication carries information about the other client.

(a.2) Unicast Security=PSK
  (1) Unicast Security Method=WEP
    Unicast key=WEP-PSK
  (2) Unicast Security Method=WPA
    Perform 4-way handshake with the other client to generate Unicast key for the direct communication link
    Unicast key=PTK (Client 1 to Client 2)—unique to Client 1 and Client 2 pair
  (3) Unicast Security Method=WPA2
    Perform 4-way handshake with the other client to generate Unicast key for the direct communication link
    Unicast key=PTK2 (Client 1 to Client 2)—unique to Client 1 and Client 2 pair
  Indicate to any listener service and driver that the direct communication link is established with the other client. The indication carries information about the other client.

(a.2) Unicast Security=802.1X based
  (1) Unicast Security Method=WEP
    Obtain key through DH (Diffie-Hillman) exchange through the AP to overcome man in the middle attack on DH
    Unicast key=DH key
  (2) Unicast Security Method=WPA
    Obtain key through DR exchange through the AP to overcome man in the middle attack on DH
    Using DH key, perform 4-way handshake with the other client to generate Unicast key for the direct communication link
    Unicast key=PTK (Client 1 to Client 2)—unique to Client 1 and Client 2 pair
  (3) Unicast Security Method=WPA2
    Obtain key through DR exchange through the AP to overcome man in the middle attack on DH
    Using DH key, perform 4-way handshake with the other client to generate Unicast key for the direct communication link
    Unicast key=PTK2 (Client 1 to Client 2)—unique to Client 1 and Client 2 pair
  Indicate to any listener service and driver that the direct communication link is established with the other client. The indication carries information about the other client.

The wireless stations use the direct link channel to exchange four-way key generation packets as data packets in the same way they exchange these packets with the access point, but with the following differences: (a) Packet addresses are source-client 1/2; destination-client 2/1; BSSID=BSSID of the AP; (b) Fields FromDS=0 and ToDS=0 in the 802.11 header; and (c) Direct channel enabled through P mode operation of driver or through a driver interface to disable sender's address matching. Clients directly exchange data packets in the same way they exchange data packets with the access point, but with the following differences: (a) Packet addresses are source-client 1/2; destination-client 2/1; BSSID=BSSID of the AP (b) fields FromDS=0 and ToDS=0 in the 802.11 header; and (c) direct channel enabled through P mode operation of driver or through a driver interfaced to disable sender's address matching.

When the quality of service function receives an indication that the direct link channel has been established, the quality of service function performs throughput tests such as packet pair tests, with the specific client, such as client 2. While performing these tests, the quality of service function marks the packets through a per packet OOB (Out Of Band) field defined by the wireless stack. Therefore, the wireless stacks on clients 1 and 2 directly transmit and receive these packets without going through the access point.

Based on the packet pair tests, the quality of service function makes a determination whether the direct link connection is providing better throughput than the path through the access point. If the direct link channel is better than the infrastructure channel, the quality of service function marks the data packets through a per packet OOB field defined by the wireless stack. Thus, the wireless stacks on clients 1 and 2 directly transmit and receive packets without going through the access point. If the infrastructure channel is better than the direct link channel, then the quality of service function does not mark the data packets through the per packet OOB field defined by the wireless stack. Thus, the wireless stacks on clients 1 and 2 transmit and receive packets through the access point. Traffic not marked for direct communication to client 2 and traffic not destined to client 2 is transmitted and received through the access point.

Clients 1 and 2 may exchange keep-alive messages such as NULL data packets or probe request/response exchanges to maintain the direct link channel in operation. If client 1 times out the direct link connection to a specific client, such as station 26, then the wireless stack on client 1 makes an appropriate indication to any listener service and driver that the direct link channel to client 2 is no longer available. From that point on, the listener service instructs its driver not to mark the packet for direct communication to client 2. The marked packets that are in transit from the listener driver to the wireless stack are transmitted by the wireless stack through the access point to client 2 and not through the direct link channel to client 2.

The quality of service function periodically performs throughput tests on the infrastructure channel to the access point and the direct link channel to client 2. Based on the tests, the data packets are marked appropriately for the best throughput.

The client that joins an access point, such as client 1, may initiate direct link discovery and establishment, since it is the one sending the probe request. Other clients having direct link capability may send additional probe requests/responses and or other 802.11 management and/or custom 802.11 data packets for discovery and for periodically assessing the quality of the direct link channel as well as for keeping the direct link state alive on peer stations. Initially, the newly associated client can send a broadcast data packet through the access point to notify all direct communication capable clients to engage in direct link discovery and establishment. In this way, another client that is sleeping will know about the arrival of the new client when it wakes up to receive the broadcast at the DTIM (delivery traffic indication map) interval.

Link selection of the direct link channel or the infrastructure channel through the access point can be performed by any link selection module that listens to the direct link up/down indications and performs link quality comparison tests. Examples of such link selection modules include the 802.11 MAC enhanced for direct link, as well as upper layer applications such as the quality of service function. Such an enhanced 802.11 MAC has a heuristic that can include different network parameters for making the selection. Examples of such network parameters include signal quality normalized with hardware sensitivity values at each modulation/data rate, observed and anticipated traffic load on clients and the access point, power save states and controls, and near field and far field RF interference information. The heuristic also should be appropriately dampened when making the switch between direct link and infrastructure modes.

The direct link channel can be used for any application where there is a need to use an alternate path for control and data in addition to the path through the access point. Some other applications of the direct link channel include but are not limited to: (a) diagnostics when a client loses a connection to the access point to report information or notify the backend server of the problem; (b) in the case where the existing power level is not sufficient to provide a good connection between the client and the access point and there are no other access points that are visible for the same network; (c) communication of information between clients about misconfigured or rogue access points to which other clients should not connect; and (d) concurrent connections where a client can form a direct link channel to another client that is not connected to the same access point. The other client may not be connected to any access point or it may be connected to another access point on a different band or on a different RF channel on the same band. An example of the application is a client that continues to have Internet access through the access point while it concurrently shares files/applications with another client that is not connected to the same access point or to any access point. If the link to the access point goes down, the direct link session may terminate, or the direct link channel only may be used.

There are options to quickly assess the direct link quality as part of direct link discovery, and the chosen option can depend on the application or can be independent of it. For quality of service functions, using the highest data rate for discovery packets is one option. Instead of always choosing the highest data rate, another option for quality of service functions is to use a data rate for discovery packets that is closer to the current average data rate observed from the access point. For usage independent of direct link discovery and establishment, discovery packets can be sent at the lowest rate of the BSS basis rate set to allow maximum probability of connection at long ranges. Once the direct link is available, it may be assessed for use or may not be used for specific applications. For example, the quality of service function may find that the direct link channel provides lower throughput when compared to the infrastructure channel to the access point and will not use the direct link channel in this case. However, the direct link channel can be used for other purposes as described above.

To further increase efficiency, the clients may chose to operate on a different channel or a different band when in direct link mode. This is facilitated by indicating power save mode to the access point. The power save indication to the access point can be added to the data exchange, for example, for key establishment with the access point. Thus, the access point buffers all Unicast and broadcast traffic destined for the clients. The access point clears the buffered broadcast packets every DTIM interval which is the same for all clients in the basic service set of the access point. For buffered Unicast packets for a client operating in the power save mode, the access point indicates the presence of any buffered Unicast packets by setting the TIM (traffic indication map) bit for that client in the periodic beacon frames. It is not necessary for the client to immediately fetch buffered Unicast packets from the access point, and this fetching can be delayed to a time interval not exceeding the listen interval for the client and the access point.

Subsequently, the client issues an RF channel change request command to the other client and upon success resumes communication on the direct link. Prior to changing the RF channel, the client may scan for the available RF channels as indicated in the capability information of the peer client or may use RE spectrum sniffer based information to select the best RF channel in terms of least interference. When the selected RF channel condition goes bad, the two clients can dynamically select another RF channel using similar procedures.

The clients may periodically check for the presence of traffic from the access point. This should happen at beacon intervals to assure that traffic indicated in the traffic indication map for Unicast traffic, as well as traffic indicated in the DTIM bit for broadcast traffic, are detected. At a minimum, the clients are required to receive a beacon every DTIM interval, since any buffered broadcast packets are always transmitted by the access point on the next transmit opportunity immediately after the beacon at the DTIM period. If no broadcast packets are buffered at the access point, then the clients can immediately notify the access point that they are in power save mode and move back to the direct link channel. For Unicast packets, the client at minimum needs to monitor beacon packets for its TIM bit every time interval not exceeding the listen interval for the client and the access point. The client does not need to monitor for Unicast packets on every beacon period boundary. If the access point sets the TIM bit for the client, then the client needs to fetch Unicast packets before the access point ages out those packets. For the case of fetching broadcast and Unicast packets from the access point, the clients can dynamically negotiate the amount of time they will be off the direct link channel. The negotiation can initially happen on the direct link channel and later through the access point if any client needs more time to fetch Unicast packets from the access point. This does not mean that traffic destined between the client stops since once the clients are on the same RF channel as the access point, the traffic can go through the access point. Additionally, the selected RF channel may be in a different band, assuming clients 1 and 2 support it and the capability information is communicated in the discovery and negotiation packets.

Figure 2:
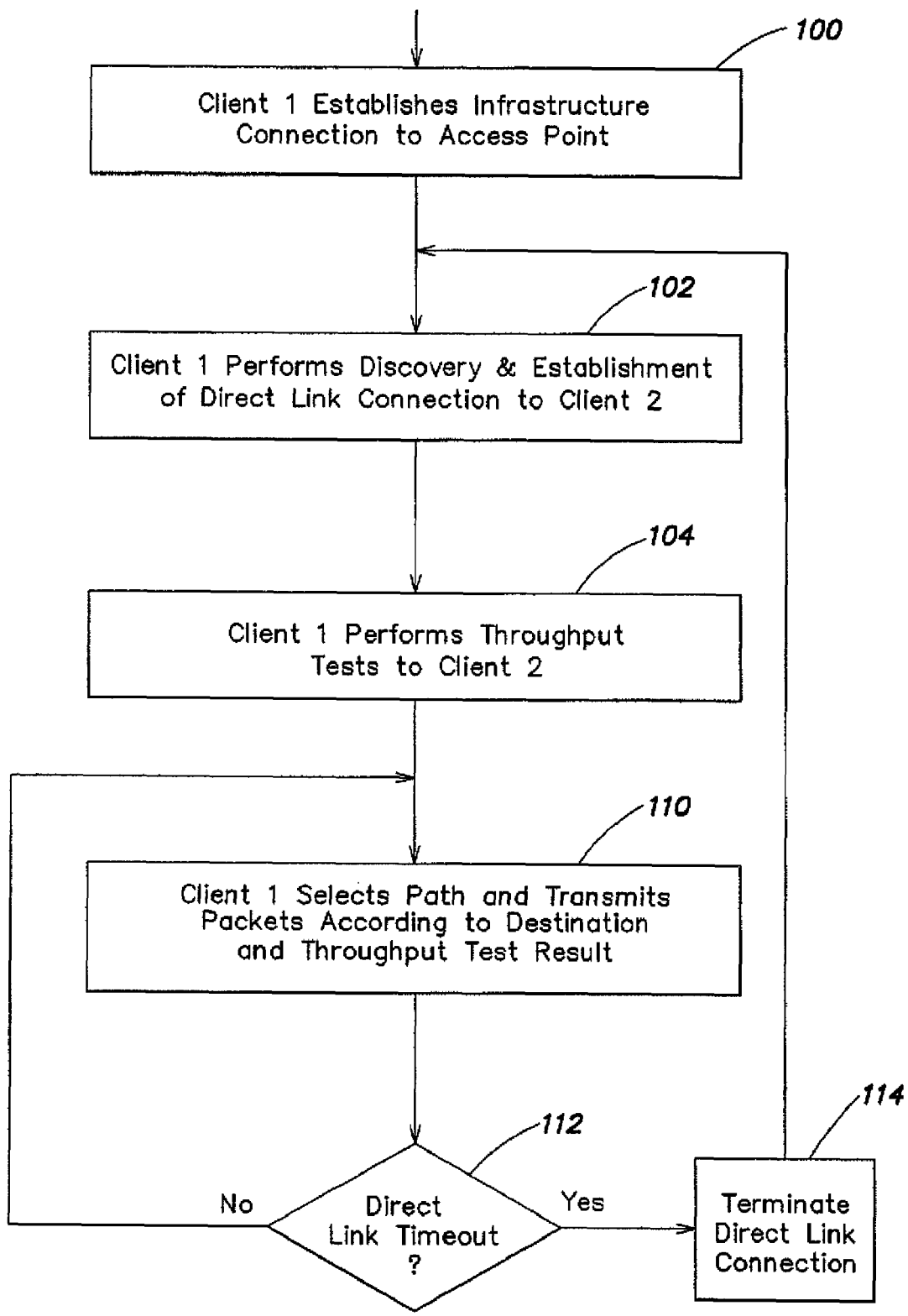
FIG. 2 is a flow chart of a communication method in accordance with an embodiment of the invention.

The wireless communication method described above is summarized in the flowcharts of FIGS. 2 and 3. In the step 100, client 1 establishes an infrastructure connection to access point 20. The infrastructure connection may be established by the standard technique defined by IEEE 802.11. In the step 102, client 1 performs discovery and establishment of a direct link connection to client 2. In some embodiments, client 2 may have an infrastructure connection to access point 20. In other embodiments, client 2 may be independent or may have an association with another access point in the same or a different network. In order to establish a direct link connection, clients 1 and 2 must both have direct link capability. Client 1 may establish a direct link connection with one or more other clients. Establishment of a direct link connection is described in greater detail below in connection with FIG. 3.

In step 104, client 1 performs throughput tests between client 1 and client 2. The throughput tests include tests of the direct link connection between client 1 and client 2. In addition, if client 2 has an infrastructure connection to access point 20, the throughput tests include tests of the path from client 1 to access point 20 and from access point 20 to client 2. The throughput tests may be performed by the quality of service function. The throughput tests indicate which path provides the best performance at the current time.

In step 110, client 1 selects a path for transmission and transmits packets according to the destination of the packets and the throughput test result. Thus, for packets destined for client 2, the path that provides the best performance according to the throughput test is selected. The path may be the direct link connection from client 1 to client 2 or may be through the access point 20. Packets having destinations other than client 2 are transmitted through the infrastructure connection to access point 20, unless an additional direct link connection provides a path to the destination.

In step 112, direct link timeout is performed. The direct link timeout determines if the direct link connection has been inactive for a predetermined time. If direct link timeout has not occurred, the process returns to step 110 for transmitting additional packets. If direct link timeout has occurred, the direct link connection is terminated in step 114 and the process returns to step 102. The direct link connection may be reestablished if needed. In other cases, the direct link connection may no longer be needed such as, for example, if client 2 is inactive or has moved out of range. In that case, client 1 continues to communicate through access point 20. As noted above, NULL data packets may be transmitted at intervals in order to keep the direct link connection alive.

Figure 3:
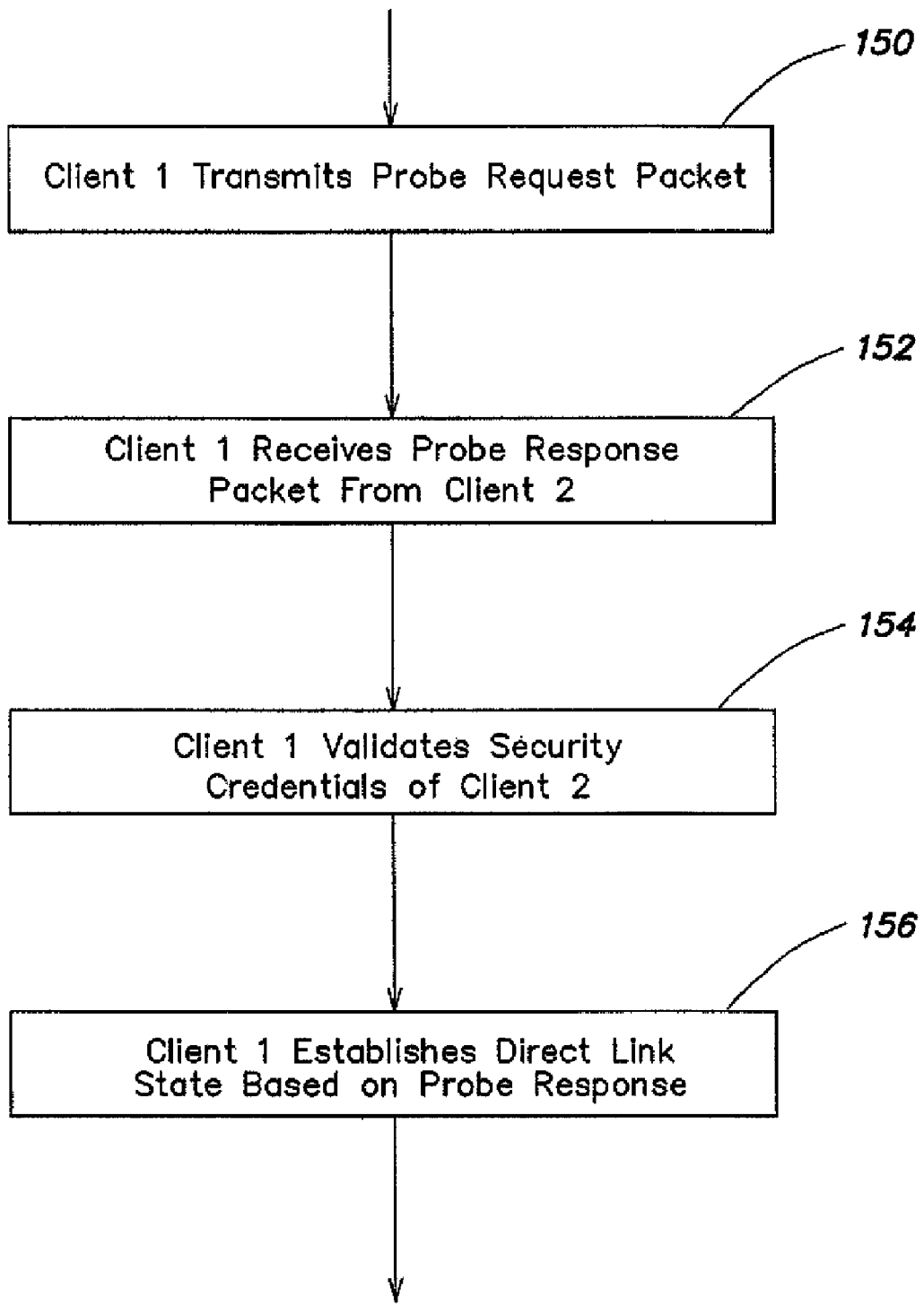
FIG. 3 is a flow chart of a method for establishing a direct link connection in accordance with an embodiment of the invention.

A process for discovery and establishment of a direct link connection to client 2 is shown in FIG. 3. The process of FIG. 3 corresponds to step 102 in FIG. 2. In step 150, client 1 transmits a probe request packet to discover other clients within range that have direct link capability. As described above, the probe request packet contains a custom information element that describes the capabilities of client 1. Assuming that client 2 is within range and has direct link capability, client 2 receives the probe request packet, extracts the client 1 capability information and creates a direct link state. Client 2 then transmits a probe response packet. The probe response packet contains a custom information element which describes the capabilities of client 2. In step 152, client 1 receives the probe response packet from client 2 and extracts the client 2 capability information. In step 154, client 1 validates the security credentials of client 2. Assuming that the security credentials of client 2 are validated, client 1 in step 156 establishes a direct link state based on the probe response. The direct link states in clients 1 and 2 define a direct link connection between clients 1 and 2. The direct link connection is established without any action by access point 20.

Figure 4:
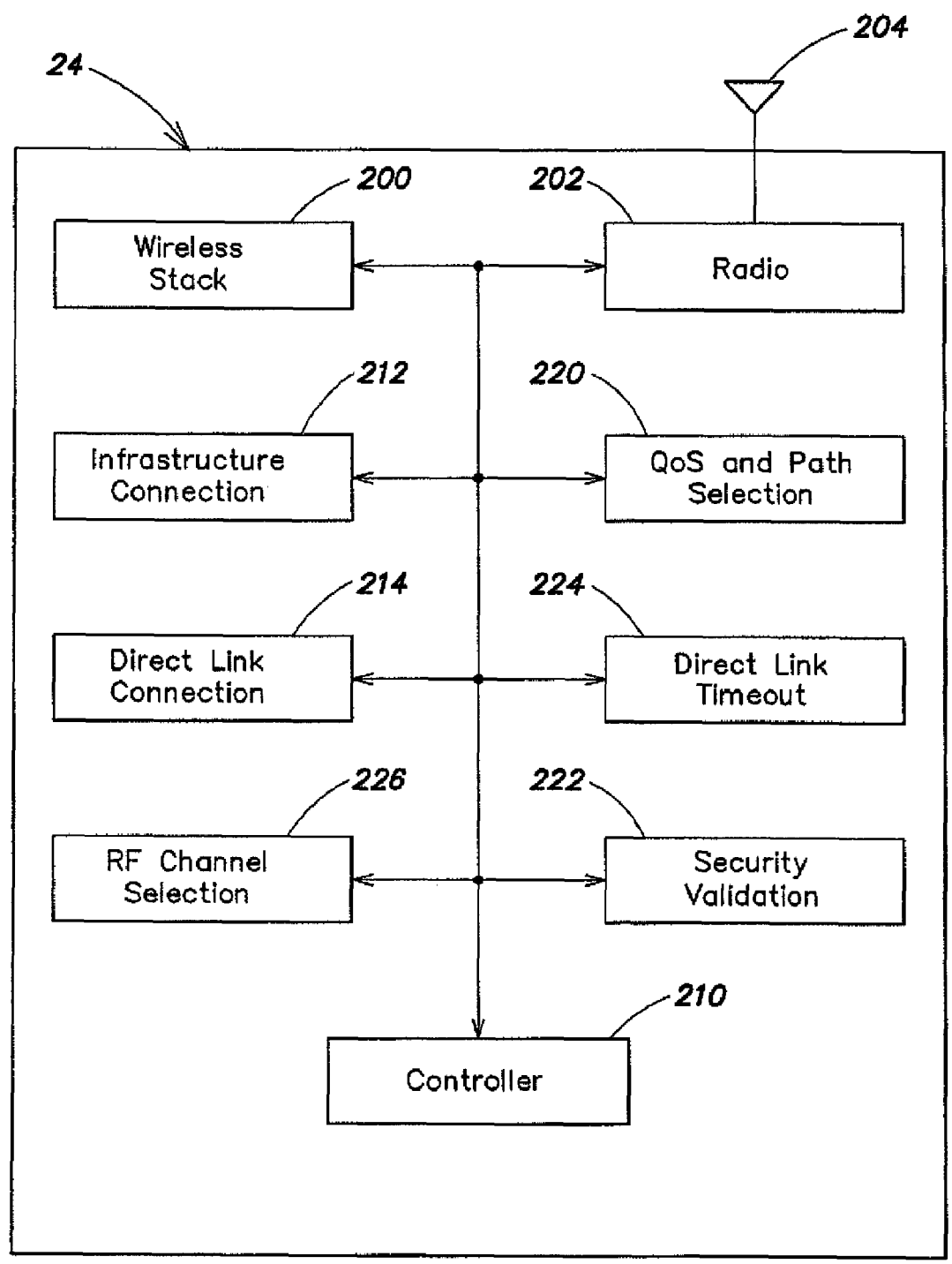
FIG. 4 is a block diagram of a wireless station, illustrating software components involved in direct link communication.

A block diagram of wireless station 24 showing software components involved in direct client-to-client communication is shown in FIG. 4. A wireless stack 200 operates with radio 202 to transmit and receive wireless communications through antenna 204. Wireless stack 200 communicates over the selected communication path, which may be the direct link channel or the infrastructure channel. A controller 210 controls establishment of an infrastructure connection 212 and a direct link connection 214 as described above. A quality of service function 220 performs throughput tests and may perform selection of a communication path for best performance. A security validation function 222 validates security credentials of clients involved in direct link connections. A direct link timeout 224 monitors the direct link connection and determines if the direct link connection has been inactive for a predetermined time. An RF channel selection function 226 selects an RF channel or RF band for direct link communication in accordance with the capabilities of the clients. The components shown in FIG. 4 perform the communication functions described above.

One example of an application of the direct link connection is media streaming. In the media streaming application, a 19 megabits per second HDTV stream is transferred from a media PC to a wireless display. The media PC and the display are connected to the same access point. The media PC and the display are also in range for direct communication. If the data is transmitted through the access point, the data traverses the air interface twice, i.e., from the media PC to the access point and from the access point to the display, thus requiring 38 megabits per second nominal bandwidth which exceeds the current capabilities of IEEE 802.11. Use of the direct link communication described above permits HDTV media streaming with existing wireless technologies.

Another example of an application of the direct link connection is for network diagnostics. A diagnostic use is to allow wireless stations to directly share connectivity data which can help diagnose connectivity problems such as failed, misconfigured or rogue access points.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described at least one illustrative embodiment of the invention, various alterations, modifications, and improvements will readily occur to those skilled in the art. Such alterations, modifications, and improvements are intended to be within and scope of the invention. Accordingly, the foregoing description is by way of example only and is not intended as limiting. The invention is limited only as defined in the following claims and the equivalents thereto.

What is claimed is:

1. A method for communication in a wireless network, comprising:
    establishing an infrastructure channel between a first wireless station and a wireless access point connected to a network;
    establishing, by the first wireless station, a direct link channel between the first wireless station and a second wireless station without action by the access point, wherein the infrastructure channel and the direct link channel have a common basic service set and a common basic service set ID;
    selecting, by the first wireless station, a channel from the direct link channel and the infrastructure channel; and
    communicating on the selected channel.

2. A method as defined in claim 1, wherein establishing a direct link channel comprises:
    sending from the first wireless station to the second wireless station a probe request packet containing capability information of the first wireless station;
    receiving from the second wireless station a probe response packet containing capability information of the second wireless station; and
    establishing a direct link state based on the received capability information, the direct link state defining the direct link channel between the first and second wireless stations.

3. A method as defined in claim 1, wherein communicating comprises transmitting and receiving on the direct link channel and checking at intervals for traffic from the access point.

4. A method as defined in claim 1, wherein selecting a channel comprises performing a throughput test of the direct link channel and the infrastructure channels and transmitting data packets between the first and second wireless stations in accordance with the result of the throughput test.

5. A method as defined in claim 1, further comprising terminating the direct link channel when the direct link channel is inactive for a predetermined time period.

6. A method as defined in claim 1, further comprising transmitting data packets at intervals on the direct link channel to keep the direct link channel active.

7. A method as defined in claim 1, further comprising responding to a direct link discovery request from another wireless station.

8. A method as defined in claim 1, establishing a direct link channel comprises transmitting a discovery request to identify a wireless station having direct link capability.

9. A method as defined in claim 2, wherein establishing a direct link channel further comprises validating security credentials of the second wireless station.

10. A computer-readable storage device encoded with instructions for execution in a wireless network, the instructions when executed, performing a method as defined in claim 1.

11. A wireless station for operation in a wireless network, comprising:
    a first component for establishing an infrastructure channel to an access point of the wireless network;
    a second component for establishing a direct link channel to a second wireless station without action by the access point, wherein the infrastructure channel and the direct link channel have a common basic service set and a common basic service set ID;
    a third component that selects a channel from the direct link channel and the infrastructure channel; and
    a fourth component that communicates on the selected channel.

12. A wireless station as defined in claim 11, wherein the third component comprises a quality of service component to perform a throughput test, wherein data packets are transmitted through the infrastructure channel or through the direct link channel according to the result of the throughput test.

13. A wireless station as defined in claim 11, further comprising a timeout component to terminate the direct link channel when the direct link channel is inactive for a predetermined time.

14. A wireless station as defined in claim 11, further comprising an RF selection component to transmit over the infrastructure channel on a first RF channel and to transmit over the direct link channel on a second RF channel.

15. A wireless station as defined in claim 11, further comprising a security validation component to validate security credentials of the second wireless station.

16. A method for establishing a direct link connection between first and second wireless stations in a wireless network, comprising:
    establishing an infrastructure channel between the first wireless station and a wireless access point connected to a wired network;
    sending from the first wireless station to the second wireless station a probe request packet containing capability information of the first wireless station;
    the first wireless station receiving from the second wireless station a probe response packet containing capability information of the second wireless station; and
    establishing, based on the received capability information, a direct link channel between the first and second wireless stations, wherein the infrastructure channel and the direct link channel have a common basic service set and a common basic service set ID.

17. A method as defined in claim 16, further comprising performing a throughput test of the direct link channel.

18. A method as defined in claim 16, further comprising terminating the direct link channel when the direct link channel is inactive for a predetermined time period.

19. A method as defined in claim 16, further comprising validating security credentials of the second wireless station.

20. A computer-readable storage device encoded with instructions for execution in a wireless network, the instructions when executed, performing a method as defined in claim 16.

* * * * *